US006788637B1

(12) United States Patent
Dang et al.

(10) Patent No.: US 6,788,637 B1
(45) Date of Patent: Sep. 7, 2004

(54) APPARATUS FOR READING FROM AND/OR WRITING TO OPTICAL RECORDING MEDIA

(75) Inventors: Lieu Kim Dang, Feldkirch (AT); Fang Lei, Durchhausen (DE)

(73) Assignee: Deutsche Thomson-Brandt GmbH, Villingen-Schwenningen (DE)

( * ) Notice: Subject to any disclaimer, the term of this patent is extended or adjusted under 35 U.S.C. 154(b) by 619 days.

(21) Appl. No.: 09/631,236

(22) Filed: Aug. 2, 2000

(30) Foreign Application Priority Data

Aug. 4, 1999 (DE) ........................................ 199 36 007

(51) Int. Cl.[7] .................................................. G11B 7/00
(52) U.S. Cl. ............................... 369/112.23; 369/44.23; 369/112.22
(58) Field of Search .......................... 369/44.11, 44.14, 369/44.24, 44.26, 44.39, 44.41, 53.23, 112.01, 112.05, 112.22, 112.23, 112.24, 118

(56) References Cited

U.S. PATENT DOCUMENTS

| | | | |
|---|---|---|---|
| 4,462,095 A | 7/1984 | Chen ........................... 369/44 |
| 4,507,772 A | 3/1985 | Yamamoto .................. 369/109 |
| 4,650,982 A | * 3/1987 | Ando ....................... 369/44.24 |
| 4,907,847 A | 3/1990 | Onayama et al. .......... 350/3.73 |
| 5,138,592 A | 8/1992 | Fujita ....................... 369/44.13 |
| 5,172,366 A | * 12/1992 | Chikuma .................... 369/120 |
| 5,255,263 A | * 10/1993 | Van Uijen et al. ....... 369/275.3 |
| 5,450,376 A | 9/1995 | Matsamura et al. .......... 369/13 |
| 5,473,471 A | 12/1995 | Yamagata et al. .......... 359/569 |
| 5,526,336 A | 6/1996 | Park et al. .................... 369/94 |
| 6,577,584 B1 | * 6/2003 | Milster et al. .............. 369/118 |

FOREIGN PATENT DOCUMENTS

EP            0346844 A2   12/1989    ............ G11B/7/12

OTHER PUBLICATIONS

Patent Abstracts of Japan, vol. 1996, No. 08 & JP 08 08773 (abstract).
Patent Abstracts of Japan, vol. 1998, No. 02 & JP 09 265653A (abstract).
Patent Abstracts of Japan, vol. 013, No. 057, Feb. 9, 1989, & JP 63 247920 A (abstract).
European Search Report citing the above–listed references: AA, AB, AM, AR, AS, and AT.
German Search Report citing the above–listed references: AA, AB, AC, AD, and AE.

* cited by examiner

*Primary Examiner*—Thang V. Tran
*Assistant Examiner*—Bach Vuong
(74) *Attorney, Agent, or Firm*—Joseph S. Tripoli; Carlos M. Herrera; Patricia A. Verlangieri

(57) ABSTRACT

An apparatus for reading from and/or writing to optical recording media on which data markings are arranged along tracks arranged next to one another. The apparatus according to the present invention comprises a light source, a focusing means and an intensity distribution converter. In the present invention, both the extent of the focus spot of the primary beam is reduced and the disadvantages occurring due to the secondary beams are reduced. In an exemplary embodiment, the intensity distribution converter comprises a filtering strip arranged in the region of the focusing means.

11 Claims, 2 Drawing Sheets

APPARATUS FOR READING FROM AND/OR WRITING TO OPTICAL RECORDING MEDIA

FIELD OF THE INVENTION

The present invention relates to an apparatus for reading from and/or writing to optical recording media on which data markings are arranged along tracks arranged next to one another. An apparatus of this type has a light source for producing a scanning beam, a focusing means for focusing the scanning beam onto a track of the recording medium, and an intensity distribution converter for reducing the spatial extent of the focus spot of the scanning beam which is produced on the recording medium by the focusing means. Consequently, a particularly good resolution of the focus spot is achieved by means of the aforementioned intensity distribution converter; the method employed is referred to as the superresolution technique.

BACKGROUND OF THE INVENTION

Such an apparatus employing the superresolution technique is disclosed for example in U.S. Pat. No. 5,121,378. Advantages of the superresolution technique reside in the fact that a smaller extent of the focused light beam can be obtained and data markings of a smaller size can thus be scanned. A smaller size of the data markings permits denser packing and thus a higher information density. A disadvantage of the superresolution technique resides in the fact that secondary beams of increased intensity are produced in addition to the actual light beam. Therefore, a light corona or a similar light distribution is produced adjacent to the light spot of the primary beam on the recording medium, caused by the secondary beams. This light distribution caused by the secondary beams has a disturbing effect on the information transmitted by means of the primary beam. The smaller the extent of the focus spot of the primary beam, the smaller the intensity of the latter becomes and the larger the intensity of the secondary beams becomes.

SUMMARY OF THE INVENTION

An object of the present invention is to propose an apparatus in which both the extent of the focus spot of the primary beam is reduced and the disadvantages occurring due to the secondary beams are reduced.

This object is achieved by means of the measures specified in the claims.

The invention provides for the intensity distribution converter to be a filtering strip arranged in the region of the focusing means. This has the advantage of reducing the extent of the central beam, the primary beam, in a perpendicular direction with regard to the strip, which means that a track having a smaller width can nevertheless be scanned without the focus spot of the primary beam overlapping adjacent tracks. The resulting plus/minus first- and higher-order secondary beams produce focus spots in the focal plane, but no large-area light distribution on the recording medium. Disturbing effects caused by the secondary beams can thus be masked out in a targeted manner. The filtering strip is an opaque strip in the simplest case; the following are likewise advantageously possible: a reflective strip, a strip which couples the light out of the optical axis to a great extent in some other way, a frequency-selective filter or a similar component which fulfils a corresponding function.

The invention furthermore provides a detector arrangement having a plurality of detector areas onto which the light reflected from the recording medium is directed, the primary beam and the secondary beams being directed onto different detector areas. This has the advantage that the primary beam can be evaluated separately, that is to say no adverse effects due to secondary beams influenced by other areas of the recording medium occur. According to a variant of the invention, the other detector areas onto which the secondary beams fall are not evaluated; they are then advantageously shadowed or non-photosensitive areas.

According to the invention, the filtering strip is arranged at a tilt angle of greater than zero degrees with respect to the direction of the tracks of the recording medium. Although the filtering strip reduces the extent of the focus spot in the direction perpendicular to the strip, it does not do so in the direction of the strip. Consequently, given parallel orientation of the strip and track to be read, the resolution of the data markings in the track direction is not improved, only that perpendicularly thereto. One advantage of the tilted arrangement of the strip resides in the fact that a compromise between reducing the track width and reducing the length of the data markings can be attained by virtue of the inclination with regard to the tracks. Overall, the readable storage capacity of the recording medium is again increased, given the same wavelength of the light used.

In this case, the tilt angle is advantageously chosen such that the plus/minus first-order secondary beams fall onto adjacent tracks. This has the advantage that, at the same time as the track scanned by the primary beam, the tracks which are adjacent to this track and are swept over by the first-order secondary beams are also evaluated with regard to their information content. This increases the effective read-out speed, that is to say the read-out data rate. In this case, the solution according to the invention is not restricted only to the directly adjacent tracks, rather, depending on the property of the strip, such as width for example, property of the light used, such as the wavelength thereof for example, and properties of the optical elements used and of the recording medium, such as the track spacing for example, provision is also made for scanning, and thus evaluating, the tracks which are in each case the second adjacent tracks, third adjacent tracks or even further removed adjacent tracks by means of the first-order secondary beams. This has the further advantage that intermediate jumps of the scanning beam to adjacent tracks situated at a further remove are necessary less often for a read-out which is as continuous as possible. The invention is likewise not restricted to the use of first-order secondary beams; it likewise lies within the scope of the invention to use the second- or higher-order secondary beams as well. Depending on the configuration of the strip, the intensity of the secondary beams is relatively highly adjustable in comparison with that of the primary beam, so that a good read-out quality can also be obtained for the secondary beams.

According to a further variant of the invention, the tilt angle is chosen such that the secondary beams produced by the filtering strip fall onto track edges. These may be either the left and right edges of the track scanned by the primary beam or edges of the tracks which are adjacent directly or at a remove with respect to the track scanned by the primary beam. One advantage of this variant resides in the fact that the signals of the secondary beams can be used for the known three-beam tracking method. This holds even when the intensity of the secondary beams is low. A smaller possible track width of the recording medium is nevertheless obtained by the reduced extent of the focus spot of the primary beam.

The filtering strip is advantageously arranged in the pupil plane of the focusing means. This has the advantage that disturbances that may be caused by diffraction effects if the filtering strip were at a relatively large distance from the lens and hence from the pupil plane do not occur.

The apparatus according to the invention advantageously has a further focusing means and a gap, which is arranged in the focal plane of the said further focusing means and on whose side remote from the focusing means one of the detector areas is arranged. This has the advantage that it is possible to obtain uncomplicated yet effective separation of primary beam and secondary beams which do not impinge on the gap and are thus shadowed. In this case, the orientation of the gap advantageously corresponds to the direction of the filtering strip. In this case, the largest spatial extent direction of the focus spot of the primary beam coincides with the longitudinal direction of the gap and the smallest spatial extent coincides with the width of the gap. The shadowing effect of the gap is thus optimal.

One of the detector areas advantageously has a dark line area, whose width is greater than the smallest width of the focused primary beam. This has the advantage of enabling detection exclusively of the secondary beams by masking out the primary beam.

In accordance with an advantageous refinement of the invention, the gap arranged before one detector area is formed by the dark line area of the other detector. In this case, the dark line area is of transparent design or is itself a gap. One advantage of this embodiment resides in the compact detector arrangement which is obtained by the combination of the detector area provided for primary beam and that provided for the secondary beams. In this case, the invention is not restricted to the utilization of the first order secondary beams; the higher-order secondary beams are also correspondingly evaluated. To that end, it is then necessary to choose a correspondingly larger width of gap or dark line area in order that the respective lower-order beams are masked out or allowed to pass. A plurality of such detector areas provided with gaps then form a detector consisting of stacked detector areas.

The invention provides for an element which splits the beam cross-section to be arranged in the beam reflected from the recording medium. In this case, the splitting is effected in a similar manner to the shadowing used in the known knife-edge method, with the difference that the area which is shadowed in accordance with the knife-edge method is not shadowed in accordance with the invention, but rather is split and utilized further. Such an element is, for example, a double prism, a grating having areas with different grating constants, a holographic optical element or a similar element which performs the corresponding function. One advantage of this variant resides in the fact that the beam is split between different detector areas and, at the same time, a beam shape which is necessary for the knife-edge focus method is produced. A conventional beam splitter and a shadowing element required for the knife-edge method are thus not necessary; a compact arrangement is obtained.

The filtering strip is advantageously arranged directly on a converging lens. In this case, the converging lens is preferably the focusing lens of the focusing means. The strip is bonded on, vapour-deposited on, cast or formed into the lens during the production thereof, or else worked, for example milled, into the said lens. One advantage of this refinement of the invention resides in the fact that an additional component carrying the filtering strip is not necessary, as a result of which the production is simplified and an outlay in terms of adjustment is not necessary.

Further advantages of the invention are contained in the following description of advantageous configurations of the invention. It goes without saying that the invention is not solely restricted to the variants specified here, but rather includes modifications and supplementations which are familiar or obvious to a person skilled in the art.

DETAILED DESCRIPTION OF THE DRAWINGS

Figure 1:
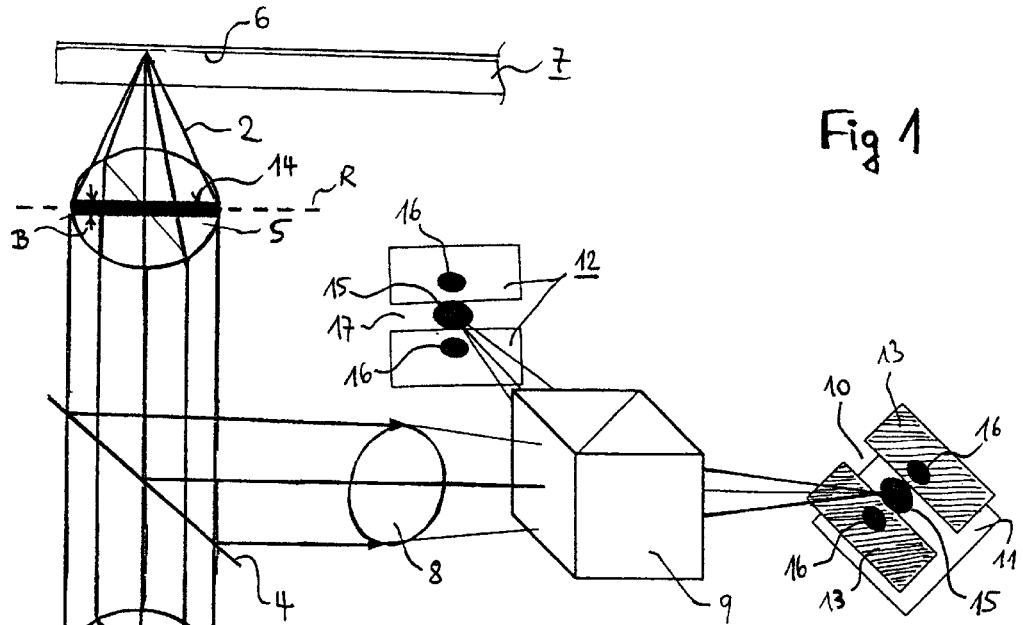
FIG. 1 shows a beam path of an apparatus according to the invention.

FIG. 1 shows a schematic illustration of the beam path of an apparatus according to the invention. A laser diode 1 produces a divergent scanning beam 2, which forms a parallel pencil of rays after passing through a lens 3. The said pencil of rays passes through a semitransparent mirror 4 and is focused onto an information-carrying layer 6 of a recording medium 7 by a focusing means, of which only the objective lens 5 is illustrated in this case. Only part of the recording medium is illustrated, in section. The scanning beam 2 is reflected from the recording medium 7, passes through the objective lens 5 and is directed onto a focusing lens 8 by the semitransparent mirror 4. The convergent beam leaving the focusing lens 8 is directed onto a first detector area 11 and a second detector area 12 by a beam splitter 9. A gap 10 is arranged between the beam splitter 9 and first detector area 11 at the focal point of the lens 8.

The objective lens 5 is provided with a filtering strip 14, which is an opaque strip in the exemplary embodiment. Diffraction phenomena have the effect that, instead of a circular focus point, a central focus spot compressed perpendicularly to the direction R of the filtering strip 14 is situated in the focal plane of the objective lens 5, and also two secondary spots which are situated at a remove from the focus spot in the direction perpendicular to the direction R. The intensity distribution is indicated at the detector areas 11, 12 in FIG. 1. A corresponding distribution of the light spots also occurs on the information-carrying layer 6, in the focal plane of the objective lens 5. It is not discernible here because of the relative sizes. Moreover, the detector areas 11, 12 and also the light spots indicated there are not shown true to scale, but enlarged. The primary spot 15, formed by the primary beam, passes through the gap 10 onto the first detector area 11, while the first-order secondary spots 16 are shadowed by the surfaces 13 bounding the gap 10. The second detector area 12 has a separating dark line 17, whose width is greater than or equal to the smallest extent of the primary spot 15. The primary spot 15 falls onto the dark line 17 and is thus not detected by the second detector area 12. Only the secondary spots 16 are detected by the second detector area 12.

Figure 2:
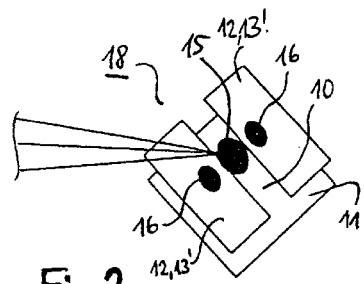
FIG. 2 shows a dual detector of an apparatus according to the invention.

FIG. 2 shows a dual detector 18 of an apparatus according to the invention. The light beam coming from the focusing lens 8 (not shown here) can be seen, the primary spot 15 of which light beam falls onto the first detector area 11, while the secondary spots 16 fall onto bounding surfaces 13', which simultaneously form the second detector areas 12. Instead of a dark line, there is a gap 10 between the second detector areas 12. The detector areas 11, 12 thus form a layered dual detector 18 which is compact and requires adjustment only once during assembly.

Figure 3:
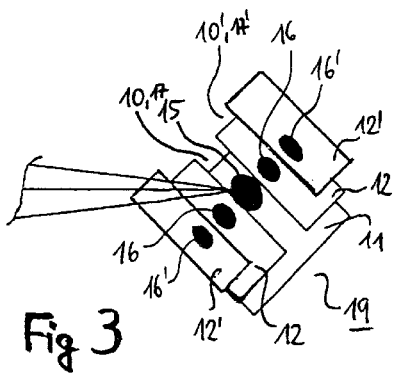
FIG. 3 shows a multiple detector of an apparatus according to the invention.

FIG. 3 shows a multiple detector, in this case a triple detector, of an apparatus according to the invention. The multiple detector 19 has a first detector area 11, second detector areas 12 and also third detector areas 12'. The primary spot 15, which passes through the gap 10 formed by the second detector areas 12, falls onto the first detector area 11. The first-order secondary spots 16, which pass together with the primary spot 15 through a gap 10' situated between the third detector areas 12' fall onto the second detector areas 12. The second-order secondary spots 16' fall onto the third detector areas 12'. The multiple detector 19 is also constructed in a layered manner. Detectors for higher numbers of spots are constructed correspondingly.

Figure 4:
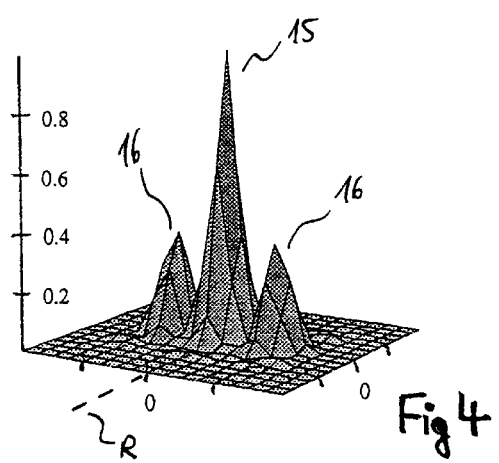
FIG. 4 shows an intensity distribution in the focal plane.

The filtering strip 14 shown in FIG. 1 forms a pupil filter which is used in the form of an opaque strip in the pupil plane of the objective lens 5. The intensity distribution of the scanning beam 2 which has passed through the objective lens 5 and the filtering strip 14 is represented in the focal plane of the objective lens in three-dimensional form in FIG. 4. The secondary maxima which form the secondary spots 16 are present only in the direction perpendicular to the direction R of the strip 14. The height of the secondary maxima, that is to say the intensity of the secondary spots 16, is dependent on the width B of the strip 14. The width of the primary beam which forms the primary spot 15 is larger perpendicular to the direction R than in the direction R, in other words the primary spot 15 has the form of an oval. In accordance with a variant of the invention, the secondary spots 16 are used to obtain a tracking signal, in accordance with the known three-beam tracking method.

Figure 7:
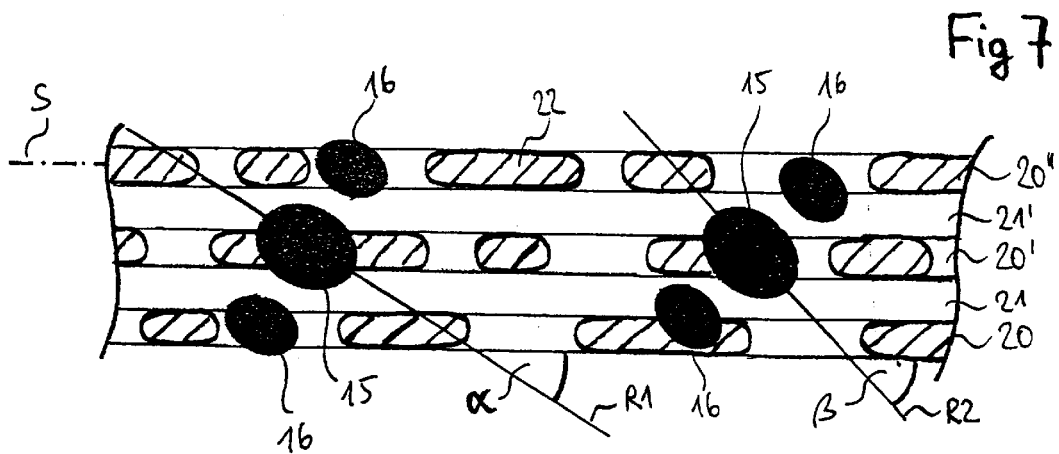
FIG. 7 shows examples of relative orientations of the focus points with respect to the track of the recording medium.

FIG. 7 shows examples of relative orientations of the focus points with respect to the track 20 of the recording medium 7. Three tracks 20, 20', 20" are illustrated by way of example. A respective inter-track area 21, 21' not utilized for information recording in the figure, is situated between the tracks 20, 20', 20". Such an inter-track area 21, 21' is also referred to as a "mirror" area. Situated on the tracks 20 are data markings 22, which are elongated to a greater or lesser extent in the track direction S, but essentially have a constant width. The data markings 22 have a different reflection factor from the areas surrounding them, or they constitute depressions which, in interaction with the areas surrounding them, lead to destructive interference of the reflected light falling onto them, or they have other properties by means of which properties of the light reflected from them are varied in such a way that information transmission is possible. Such variants are known to the person skilled in the art and are not, therefore, explained in any detail here.

Primary spot 15 and secondary spots 16 which are produced in accordance with a first direction R1 of the strip 14 are illustrated in the left-hand part of FIG. 7. There is an angle α between first direction R1 and track direction S. The angle α, the distance between the primary spot 15 and the secondary spots 16 and the distance between the tracks 20 are coordinated with one another in such a way that the primary spot 15 sweeps over the data markings 22 of the central track 20', while the secondary spots 16 sweep over the data markings 22 of the adjacent tracks 20, 20". All three tracks 20, 20', 20" can be read simultaneously in this way. The second detector areas 12 are read separately in this case.

A further arrangement of primary spot 15 and secondary spots 16 which corresponds to a second direction R2 of the strip 14, is illustrated in the right-hand part of FIG. 7. Second direction R2 and track direction S include an angle β. The latter is somewhat greater than the angle α described above, which means that although the primary spot 15 still sweeps over the central track 20', the secondary spots 16, by contrast, sweep over the edge areas of the adjacent tracks 20, 20". Consequently, half of the secondary spots 16 is situated on a track 20, 20", and the other half is situated on an inter-track area 21, 21'. By rotating the strip 14 appropriately, it is thus possible to bring the secondary spots 16 to the exact desired position with respect to the track 20, 20', 20" in order to produce an optimum tracking signal in accordance with the three-beam method. In this case, the width B of the strip 14 is chosen such that the distance between the two secondary spots 16 is not very much greater than the track period of the recording medium 7. As a result, three spots are inclined with respect to the track.

In comparison with a diffraction-limited focus point produced without a filtering strip 14, the resolution with the above-described intensity distribution according to the invention is greater in the direction perpendicular to the direction R of the strip 14. The inclined position of the oval primary spot 15 with respect to the track 20' results in a higher resolution both in terms of track spacing and with regard to the extent of the data marking 22 in the track direction S. In the borderline case, primary spot 15 and the secondary spots 16 are arranged on a line perpendicular to the track direction S. In this case, an increased resolution is achieved only with regard to the track spacing, but not in the track direction S, since the extent of the primary spot 15 in the direction R is unchanged from the case where a strip 14 is not used. In the case of the arrangement as shown in the right-hand part of FIG. 7, the track error signal is formed as the difference between the two second detector areas 12.

Figure 5:
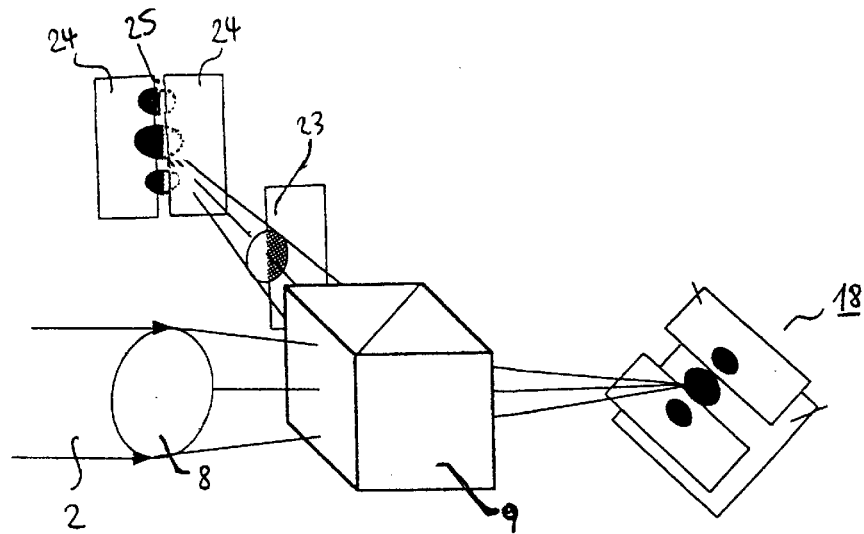
FIG. 5 shows a beam path of a first variant of an apparatus according to the invention.

FIG. 5 shows the beam path of a first variant of an apparatus according to the invention. The scanning beam 2 can be seen, which comes from the semitransparent mirror 4 and passes through the focusing lens 8. The components which are arranged to the left of the lens 8 in accordance with FIG. 1 are not represented here since they are unchanged compared with FIG. 1. The light passing directly through the beam splitter 9 falls onto a dual detector 18 in accordance with FIG. 2, which is not discussed in any more detail here. The light pencil deflected by the beam splitter 9 is shadowed by a screen 23, half of which is introduced into the beam path, and falls onto fourth detector areas 24. The fourth detector areas 24 are separated by a dark line 25 and arranged in the focal plane of the focusing lens 8. If the information-carrying layer 6 is situated exactly in the focal plane of the objective lens 5, then the focused secondary spots 16 and primary spot 15 fall exactly onto the dark line 25. In the event of defocusing, the respective non-shadowed half of the spots 15, 16 falls onto one of the two parts of the fourth detector area 24. Depending on which of the parts of the fourth detector area 24 outputs a signal, the direction in which defocusing is effected is ascertained. The focus error signal is formed as the difference between the signals output by the two parts of the fourth detector area 24.

Figure 6:
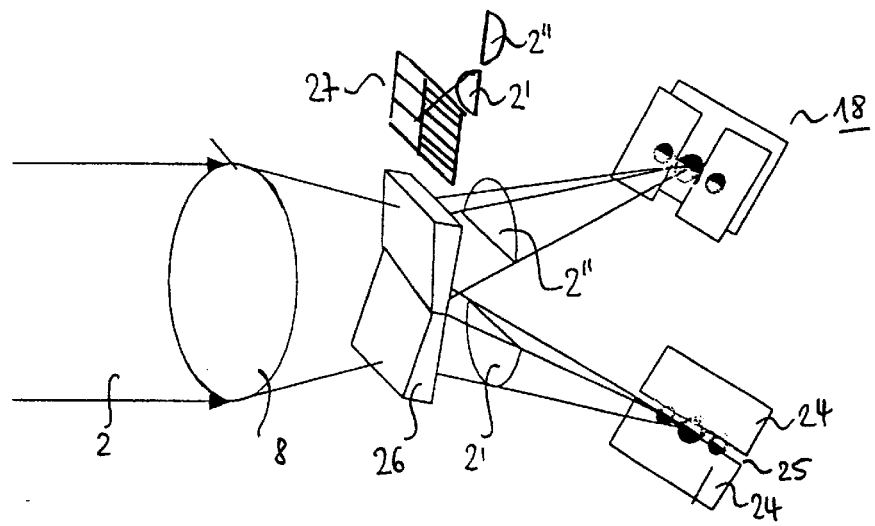
FIG. 6 shows a beam path of a second variant of an apparatus according to the invention.

FIG. 6 shows the beam path of a second variant of an apparatus according to the invention. The focusing lens 8 is in this case followed by a double prism 26, which splits the cross-section of the scanning beam 2 into two halves 2' 2". One half 2" falls onto fourth detector areas 24, which are separated from one another by a dark line 25 as in FIG. 5. This detector area 24 serves for generating a focus error signal in accordance with the Foucault or knife-edge method. The other half 2" passes to a dual detector 18, which corresponds to the dual detectors described above but in this case is irradiated only by "half" spots 15, 16. A double grating 27, which can likewise be used as the element which splits the beam cross-section, is formed above the double prism 26. In this case, the halves 2', 2" are not displaced relative to one another perpendicularly to their separating line, but rather in the direction thereof. Corresponding detection is provided in this case, too. The double grating 27 has two areas having different grating constants which deflect the light respectively falling onto them out of the optical axis to varying extents and thus produce the halves 2', 2" which are completely separate at some distance.

What is claimed is:

1. Apparatus for reading from or writing to optical recording media on which data markings are arranged along tracks arranged next to one another, the apparatus comprising:

a light source for generating a scanning beam of light;

a focusing means for focusing the scanning beam onto a track of the recording medium; and an intensity distribution converter for reducing the spatial extent of the focus spot of the scanning beam, the intensity distribution converter comprising a filtering strip arranged in the region of the focusing means, wherein the filtering strip is arranged at a tilt angle of greater than zero degrees with respect to the direction of the tracks of the recording medium.

2. Apparatus according to claim 1, further comprising a detector arrangement having a plurality of detector areas onto which a light reflected from a recording medium is directed, wherein a primary beam and secondary beams are directed onto different detector areas.

3. Apparatus according to claim 2, wherein the tilt angle is chosen such that first-order secondary beams fall onto adjacent tracks.

4. Apparatus according to claim 2, wherein the tilt angle is chosen such that the secondary beams produced by the filtering strip fall onto edges of the tracks of the recording medium.

5. Apparatus according to claim 1, wherein the filtering strip is arranged in a pupil plane of the focusing means.

6. Apparatus according to claim 2, wherein the apparatus comprises a further focusing means and a gap, which is arranged in the focal plane of the further focusing means and on whose side remote from the focusing means one of the detector areas is arranged.

7. Apparatus according to claim 2, wherein one of the detector areas has a dark line area, whose width is greater than the smallest width of a primary spot of the focused primary beam.

8. Apparatus according to claim 2, wherein the apparatus comprises a further focusing means and a gap, which is arranged in the focal plane of the further focusing means and on whose side remote from the focusing means one of the detector areas is arranged and wherein one of the detector areas has a dark line area, whose width is greater than the smallest width of a primary spot of the focused primary beam.

9. Apparatus according to claim 8, wherein the gap arranged before one detector area is formed by a dark line area of the other detector.

10. Apparatus according to claim 1, further comprising a beam splitting element for splitting the beam cross-section arranged in a beam reflected from a recording medium.

11. Apparatus according to claim 1, wherein the focussing means comprises a converging lens provided with a filtering strip.

* * * * *